United States Patent Office 2,914,550
Patented Nov. 24, 1959

2,914,550

TERTIARY ALKYL CARBINYL ORTHOSILICATES

Christian A. Seil, Los Angeles, Calif., assignor to Douglas Aircraft Company, Inc., Santa Monica, Calif.

No Drawing. Application August 1, 1955
Serial No. 525,778

1 Claim. (Cl. 260—448.8)

This invention relates to new compositions of matter in the form of new chemical compounds comprising tertiary alkyl carbinyl orthosilicate esters containing tertiary alkyl carbinyl radicals having from 5 to 10 carbon atoms in the radical and from 20 to 60 carbon atoms in the molecule of the orthosilicate.

The silicate esters of this invention, in addition to being useful as are tetra (alkyl) orthosilicates known in the art of corresponding number of carbon atoms, have a surprising and unexpected degree of thermal stability.

The orthosilicates of this invention accordingly are useful as heat transfer media over wide temperature ranges, as internal combustion engine coolants, as hydraulic fluids or components thereof for aircraft, in torque transfer devices, fluid transmissions, hydraulic brakes, hydraulic shock absorbers and as lubricants, in which uses exceptional thermal stability is an especially desirable property.

More particularly the orthosilicates of this invention have properties similar to and uses similar to those described in Patent No. 2,643,263 to Morgan, but in addition have unexpectedly high thermal stability so that the silicates of this invention are useful where such higher thermal stability is needed, such as in systems where bulk oil temperatures are in the range of 500° F. and higher.

The orthosilicates of this invention may be prepared from tetra (ethyl) orthosilicate and the corresponding alcohols in a manner shown in the art. For example, 2,2,4-trimethylpentanol or 1-methylcyclohexylmethanol or tertiary butyl carbinol may be used as the alcohols.

The following examples will illustrate my invention:

Tetra (2,2,4-trimethylpentyl) orthosilicate is made from tetra (ethyl) orthosilicate in a manner known in the art as disclosed by Patent No. 2,643,263, for example, using 2,2,4-trimethylpentanol as the alcohol. The resulting tetra (2,2,4-trimethylpentyl) orthosilicate has a boiling point at atmospheric pressure approximating 670° F. and a boiling point of 175–180° C. at 1 mm. of mercury pressure. Analysis for carbon and hydrogen gives 70.4% ±0.2 carbon and 12.3% ±0.3 hydrogen. This new chemical compound has an unexpectedly and surprisingly high degree of thermal stability. The decomposition temperature, for example, is at least about 75° F. higher than for the tetra (2-ethylhexyl) orthosilicate and the tetra (1-methylhexyl) orthosilicate disclosed in said Patent No. 2,643,263.

Further examples of the chemical compounds of my invention include tetra (1-methylcyclohexylcarbinyl) orthosilicate which has an atmospheric boiling point of approximately 700° F. and a boiling point of 190–195° C. at 1 mm. of mercury pressure and tetra (tertiary butyl carbinyl) orthosilicate which has an atmospheric boiling point of approximately 590° F. and a boiling point of 110–115° C. at 1 mm. of mercury pressure.

The orthosilicates of this invention also include those silicates exemplified by hexa (tertiary alkyl carbinoxy) disiloxanes such as hexa (2,2-dimethylpropoxy) disiloxane, hexa (2,2,4-trimethylpentoxy) disiloxane, and hexa (1-methylcyclohexylmethoxy) disiloxane. A procedure for preparing disiloxanes of this invention is illustrated by the following example of the preparation of hexa (2,2,4-trimethylpentoxy) disiloxane.

One hundred and thirty grams of 2,2,4-trimethylpentanol is added with stirring to 60 grams of silicon tetrachloride in a flask maintained under a partial vacuum to remove hydrogen chloride gas. The resultant mixture is distilled at reduced pressure and the fraction boiling between 160° C. and 170° C. at 1 mm. of mercury pressure is collected as tri (2,2,4-trimethylpentoxy) chlorosilane. One hundred and thirty five grams of tri (2,2,4-trimethylpentoxy) chlorosilane is allowed to react with a mixture of 26 grams of pyridine and 2.7 grams of water. The resultant mixture is diluted with an equal volume of diethyl ether, filtered, and washed with dilute sodium bicarbonate solution. The ethereal layer is dried over anhydrous magnesium sulfate and distilled at reduced pressure. The resulting hexa (2,2,4-trimethylpentoxy) disiloxane is collected as the fraction boiling between 225–235° at 1 mm. of mercury pressure. Analysis for carbon and hydrogen gives 68.4% ±0.2 carbon and 12.4% ±0.3 hydrogen.

Hexa (1-methylcyclohexylmethoxy) disiloxane prepared in a similar manner using 1-methylcyclohexylmethanol as the alcohol has a boiling point of about 230–240° C. at 1 mm. of mercury pressure and hexa (2,2-dimethylpropoxy) disiloxane prepared in a similar manner using tertiary butyl carbinol as the alcohol, has a boiling point of about 160–170° C. at 1 mm. of mercury pressure.

Thus the invention relates to such orthosilicate esters having a total from 20 to 60 carbon atoms and from 1 to 2 silicon atoms each of which has at least 3 of the 4 chemical bonds attached to alkoxy radicals of from 5 to 10 carbon atoms, and, when having only one such silicon atom, the fourth bond is attached to such an alkoxy radical, and, when having two such silicon atoms, the fourth bond of each is attached to the same linking oxygen atom.

These orthosilicates may be represented by the following formula:

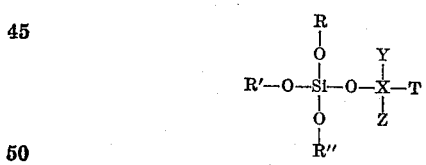

in which R, R', and R" are tertiary alkyl carbinyl radicals having from 5 to 10 carbon atoms, O is oxygen, Si is silicon, X is a member of the group consisting of carbon and silicon, and, when X is carbon, T, Y and Z are hydrogen or tertiary alkyl radicals such that the radical

is a tertiary alkyl carbinyl radical having from 5 to 10 carbon atoms, and, when X is silicon, T, Y and Z are tertiary alkyl carbinyloxy radicals having from 5 to 10 carbon atoms.

The foregoing describes my invention in its preferred aspects and illustrates my invention by way of specific examples, but alteration and modification may be made thereof within the scope of the appended claim without departing from the invention herein disclosed.

I claim:
Tetra (1-methylcyclohexylmethyl) orthosilicate.

References Cited in the file of this patent

UNITED STATES PATENTS

| | | |
|---|---|---|
| 2,395,880 | Kirk | Mar. 5, 1946 |
| 2,625,520 | Rust et al. | Jan. 13, 1953 |
| 2,643,263 | Morgan | June 23, 1953 |
| 2,673,870 | Johns | Mar. 30, 1954 |
| 2,727,054 | Wright | Dec. 13, 1955 |

OTHER REFERENCES

Bradley et al.: Jr. Chem. Soc. (London), 1952, pages 2027–32.